US012589816B2

(12) United States Patent
    Strütt

(10) Patent No.: US 12,589,816 B2
(45) Date of Patent: Mar. 31, 2026

(54) FIFTH WHEEL PLATE AND FIFTH WHEEL COUPLING

(71) Applicant: JOST-WERKE DEUTSCHLAND GMBH, Neu-Isenburg (DE)

(72) Inventor: Achim Strütt, Riedstadt (DE)

(73) Assignee: Jost-Werke Deutschland GmbH, Neu-Isenburg (DE)

( * ) Notice: Subject to any disclaimer, the term of this patent is extended or adjusted under 35 U.S.C. 154(b) by 586 days.

(21) Appl. No.: 18/083,862

(22) Filed: Dec. 19, 2022

(65) Prior Publication Data

US 2023/0202591 A1     Jun. 29, 2023

(30) Foreign Application Priority Data

Dec. 23, 2021    (DE) .......................... 102021134549.9

(51) Int. Cl.
| | |
|---|---|
| *B62D 53/08* | (2006.01) |
| *B60D 1/24* | (2006.01) |
| *B60D 1/48* | (2006.01) |

(52) U.S. Cl.
CPC ............ *B62D 53/0885* (2013.01); *B60D 1/24* (2013.01); *B60D 1/48* (2013.01)

(58) Field of Classification Search
CPC ......... B62D 53/0885; B60D 1/24; B60D 1/48
See application file for complete search history.

(56) References Cited

U.S. PATENT DOCUMENTS

| | | | | |
|---|---|---|---|---|
| 2,718,411 A | * | 9/1955 | Geerds ............... | B62D 53/0885 |
| | | | | 403/135 |
| 3,531,850 A | | 10/1970 | Durand | |
| 4,752,081 A | * | 6/1988 | Reeners ............ | B62D 53/0885 |
| | | | | 280/433 |
| 5,522,613 A | * | 6/1996 | Heeb .................. | B62D 53/0885 |
| | | | | 280/433 |
| 5,746,438 A | * | 5/1998 | Bergmann ......... | B62D 53/0885 |
| | | | | 280/433 |

(Continued)

FOREIGN PATENT DOCUMENTS

| | | |
|---|---|---|
| DE | 3741330 A1 | 6/1989 |
| DE | 29603641 U1 | 8/1996 |

(Continued)

OTHER PUBLICATIONS

European extended Search Report dated May 12, 2023 for family member Application No. 22213674.9.

(Continued)

*Primary Examiner* — Valentin Neacsu
*Assistant Examiner* — Marlon A Arce
(74) *Attorney, Agent, or Firm* — Hudak, Shunk & Farine Co. LPA

(57) ABSTRACT

Fifth wheel plate with a sliding plate having a top surface and a bottom surface. The sliding plate is detachably secured to the fifth wheel plate by at least one screw connection, the screw connection including a fastening means having a screw head and a threaded shank. The fifth wheel plate screw connection includes a form-fit element which bears against the bottom surface of the sliding plate and which has a form-fit means. The form-fit means cooperates with the sliding plate and forms a form-fit connection acting in the direction of a horizontal plane.

20 Claims, 4 Drawing Sheets

(56)     References Cited

U.S. PATENT DOCUMENTS

| | | | |
|---|---|---|---|
| 6,010,141 | A | 1/2000 | Huntimer et al. |
| 6,371,504 | B1 * | 4/2002 | Alguera Gallego .......................... B62D 53/0885 280/433 |
| 7,036,839 | B2 * | 5/2006 | Hungerink .............. F16N 15/02 280/433 |
| 7,931,291 | B2 * | 4/2011 | Mann ..................... B62D 53/10 280/433 |
| 8,602,438 | B2 | 12/2013 | Stanifer et al. |
| 2008/0164677 | A1 * | 7/2008 | Huntimer ........... B62D 53/0885 29/898.07 |
| 2014/0008893 | A1 | 1/2014 | Loukus et al. |
| 2017/0100972 | A1 * | 4/2017 | Pulliam .................. B60D 1/075 |

FOREIGN PATENT DOCUMENTS

| | | | |
|---|---|---|---|
| DE | 102006044421 | A1 | 3/2008 |
| EP | 0062271 | A1 | 10/1982 |
| WO | 9851559 | A1 | 11/1998 |

OTHER PUBLICATIONS

European Communication dated Apr. 23, 2025 for corresponding European Application 22213674.9.

\* cited by examiner

FIFTH WHEEL PLATE AND FIFTH WHEEL COUPLING

FIELD OF THE INVENTION

The invention concerns a fifth wheel plate with a sliding plate having a top surface and a bottom surface, and with a horizontal plane, the sliding plate being detachably fastened to the fifth wheel plate by at least one screw connection, the screw connection comprising a fastening means having a screw head and a threaded shank, and a fifth wheel coupling comprising such a fifth wheel plate.

BACKGROUND OF THE INVENTION

Fifth wheels couplings are used for articulated connection of a tractor to a semitrailer, which then together form a so-called double train. The fifth wheel coupling has a fifth wheel plate with a V-shaped or mouth like insertion cut-out, also known as the coupling or capture mouth, which is bounded on both sides by a somewhat downward sloping horn. The insert cut-out, the coupling mouth, passes into a central recess, in which a wearing ring can be arranged. On either side of the wearing ring, there are lock elements, especially a lock jaw, which are disengaged from the central recess when the fifth wheel coupling is open. The fifth wheel plate is permanently joined to the frame of the tractor primarily by means of bearing blocks or pedestals and possibly a mounting plate.

On the semitrailer, at the bottom of the front end, there is an upper plate on which is arranged a king pin. In the coupling process, this pin is guided by the fifth wheel plate. As soon as the king pin lies against the wearing ring, the lock elements are brought into the locking position, whereupon the lock jaw embraces the king pin with form fit, yet able to rotate.

A significant problem with such couplings is the friction between the fifth wheel plate and the upper plate of the trailer, especially because of the constant relative motions between them while traveling on curves, since the fifth wheel plate in normal use is typically secured to the truck and unable to turn about a vertical axis.

Numerous strategies have been adopted to reduce this fundamentally dictated friction, the fastening screws of the sliding lining are heavily exposed to shear force due to the turning during operation of the semitrailer, so that under certain circumstances the fastening screws can break off.

It is known from DE 29603641 U1 to fasten arc-shaped sliding plates, preferably made of plastic material, in corresponding recesses of the fifth wheel plate by means of screw connections.

The material of the sliding plates generally has a coefficient of thermal expansion higher than steel, the material from which the fifth wheel plate itself is made. By the action of heat, e.g. by the sun or by high outdoor temperatures when semitrailers in both regions, the sliding plate then expands very greatly, which results in an additional mechanical loading of the fastening screws.

To address this problem, DE 296 03 641 U1 calls for making the surface of the cavity somewhat larger than is necessary to accommodate the sliding plate. Therefore, although the sliding plate can expand without being exposed to high stresses and breaking apart, the mechanical loading of the fastening screws still remains.

SUMMARY OF THE INVENTION

The problem of the invention is to configure a fifth wheel plate comprising a sliding plate such that a secure fastening of the sliding plate is assured, even under strong shear forces.

The problem is solved with a fifth wheel plate as described herein.

The fifth wheel plate for a fifth wheel coupling has a sliding plate which has a top surface and a bottom surface. The fifth wheel plate has a horizontal plane. The sliding plate is detachably fastened to the fifth wheel plate by means of at least one screw connection. The screw connection has a fastening means with a screw head and a threaded shank. The fifth wheel plate is provided with holes adapted to the screw connection.

The fifth wheel plate is characterized in that the screw connection comprises a form-fit element which bears against the bottom surface of the sliding plate and has a form-fit means, and that the form-fit means cooperates with the sliding plate and forms a form-fit connection acting in the direction of the horizontal plane. The form-fit connection between the sliding plate and the form-fit element has the advantage that shear forces occurring in the sliding plate are directed into the form-fit element and thus not into the fastening means. A damage to the fastening means is prevented, so that secure fastening of the sliding plate is ensured.

The horizontal plane is understood to be an xy-plane of an xyz-coordinate-system.

Preferably, the sliding plate consists of at least two sliding plate parts, in particular of two arc-shaped sliding plate halves.

Preferably, the form-fit means presses into the material of the sliding plate on the bottom surface of the sliding plate. The material of the form-fit means is preferably harder than the material of the sliding plate, so that the form-fit means can penetrate the material of the sliding plate during assembly of the sliding plate without damaging the form-fit means. This has the further advantage that there is also no need to make a recess on the underside of the sliding plate into which the form-fit means has to engage in order to produce the form-fit connection.

Preferably, the form-fit means comprises at least one protrusion. Preferably, the protrusion is annular, more preferably circular or oval.

The protrusion can also be formed in the shape of circular arcs. Two or more protrusions may also be provided, which are arranged concentrically.

Preferably, individual line-shaped protrusions may also be provided, which may be arranged in the horizontal plane in any desired manner relative to one another, for example in a cross-shaped manner or orthogonally relative to one another. Preferably, the line-shaped protrusions are arranged in a star-shaped pattern or in a rectangular pattern.

Preferably, the protrusion is a serration, more preferably a ring serration. A ring serration has the advantage that the form-fit action is effective in all directions lying in the horizontal plane.

Preferably, the ring serration forms a closed circle. The ring serration can also consist of several circular arcs. Preferably, a single ring serration is provided.

Preferably, two or more ring serrations are provided, which are preferably arranged concentrically. This embodiment is particularly suitable for harder sliding plate materials into which the ring serration cannot penetrate as far as is possible with softer sliding plate material.

Preferably, the form-fit means at least partially surrounds the fastening means. In this way, shear forces from different directions lying in the horizontal plane, which occur when coupling the trailer and when cornering, can be kept away from the fastening means.

Preferably, the form-fit element is arranged in a form-fit and/or substance-fit manner in a hole in the fifth-wheel plate. The form-fit and/or the substance-fit preferably also acts in the direction of the horizontal plane. This arrangement has the advantage that the shear forces introduced into the form-fit element are introduced directly into the fifth-wheel plate. In this way, the shear forces are almost completely diverted past the fastening means, for example the fastening screw.

Preferably, the form-fit element has a circumferential wall, an upper end surface facing the sliding plate and a lower end surface, the form-fit means being arranged on the upper end surface.

The form-fit element is preferably a cylindrical body. The form-fit element is further preferably a prism, in particular a quadrangular, pentagonal or hexagonal prism. The shape and dimension of the hole of the fifth wheel plate and the outer contour of the form-fit element are preferably matched accordingly. For example, if the form-fit element is a square prism, the hole of the fifth wheel plate is also square.

Preferably, the form-fit element comprises a central bore, with the threaded shank of the fastening means extending into or through the bore. The central bore may be a through bore or a blind bore.

According to one embodiment, the central bore has a threaded bore into which the threaded shank is threaded. In this embodiment, the form-fit element also performs the function of a nut of the threaded connection. An additional nut is not required.

According to a further embodiment, the central bore may be a through bore. The through bore may be an unthreaded bore.

Preferably, the form-fit element is a washer, preferably an annular washer.

Preferably, the diameter of the central bore of the form-fit element is such that the shank of the fastening means does not contact the wall of the central bore. This measure also helps to ensure that shear forces are not introduced into the fastener.

The form-fit element is preferably arranged between the screw head and a nut. This embodiment is preferred for the washer.

Preferably, the sliding plate has at least one sliding plate hole in which an annular shoulder is formed. Preferably, all of the sliding plate holes are provided with an annular shoulder.

Preferably, the form-fit means of the form-fit element is arranged below the annular shoulder.

Preferably, the screw head engages the annular shoulder. When the fastening screw is screwed in, the annular shoulder is pressed onto the form-fitting means so that the latter can press into the material of the sliding plate.

Preferably, the fastening means is a fastening screw. Preferably, the fastening means is a one-piece fastening screw or a multi-piece fastening screw.

The fastening screw preferably has a lower head shoulder between the screw head and the threaded shank. The diameter D4 of the lower head shoulder is preferably larger than the diameter D5 of the central bore of the form-fit element, so that the lower head shoulder rests on the upper end surface of the form-fit element.

Preferably, a first annular space is provided in a sliding plate hole between the screw head and the sliding plate.

Preferably, a second annular space is provided in a sliding plate hole between the lower head shoulder and the sliding plate.

Each annular space offers the advantage that the fastening means in this area is not in contact with the sliding plate and thus does not have to absorb shear forces.

Preferably, the sliding plate is made of a deformable material. Particularly preferably, the sliding plate consists of a plastic material.

Preferably, the fifth wheel plate is made of a sheet metal moulding. In the case of sheet metal, the holes of the fifth wheel plate can advantageously be punched out, whereby the shape of the holes can be adapted in a simple manner to the outer contour of the form-fit element for achieving a form-fit.

The problem is also solved with a fifth wheel coupling comprising a fifth wheel plate and a sliding plate according to claims 1 to 19.

BRIEF DESCRIPTION OF THE DRAWINGS

Preferred embodiments of the invention are explained in more detail below with reference to the figures.

They show.

DETAILED DESCRIPTION OF THE INVENTION

Figure 1:
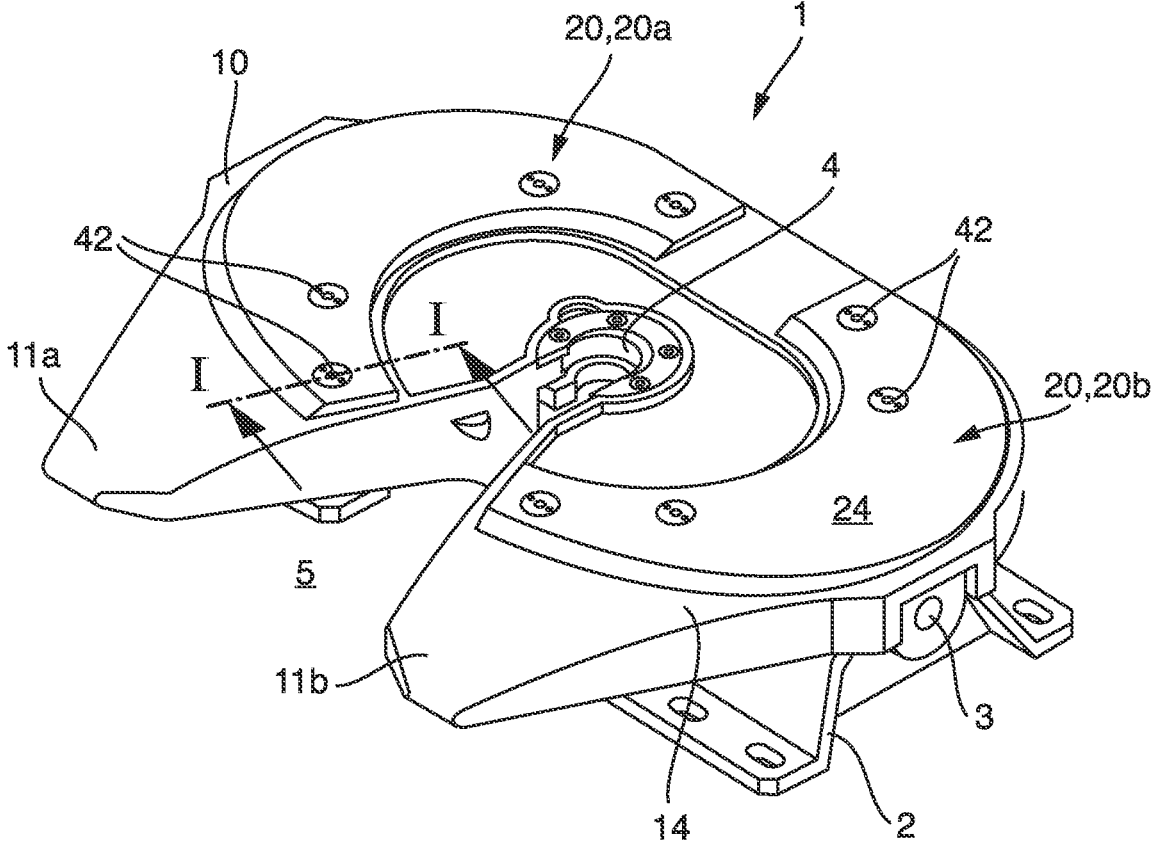
FIG. 1 a fifth wheel coupling in perspective view.

In FIG. 1, a fifth wheel coupling 1 is shown in perspective. The fifth wheel 1 has a fifth wheel plate 10 which is pivotally mounted in a bearing block 2 or pedestal by means of pivot pins 3. In the embodiment shown here, the fifth wheel plate 10 consists of a sheet metal moulding. The fifth wheel plate 10 has two horns 11a, b between which an entry opening 5 is formed for a kingpin of a semi-trailer (not shown). The kingpin is received by a wear ring 4 when it reaches its end position.

A sliding plate 20 is arranged on the upper side 14 of the fifth wheel plate 10, which consists of two arc-shaped sliding plates halves 20a, b. The sliding plate halves 20a, b, which can be made of a plastic material, are attached to the top surface 14 of the fifth wheel plate 10 by fastening screws 42 of a screw connection 40.

Figure 2:
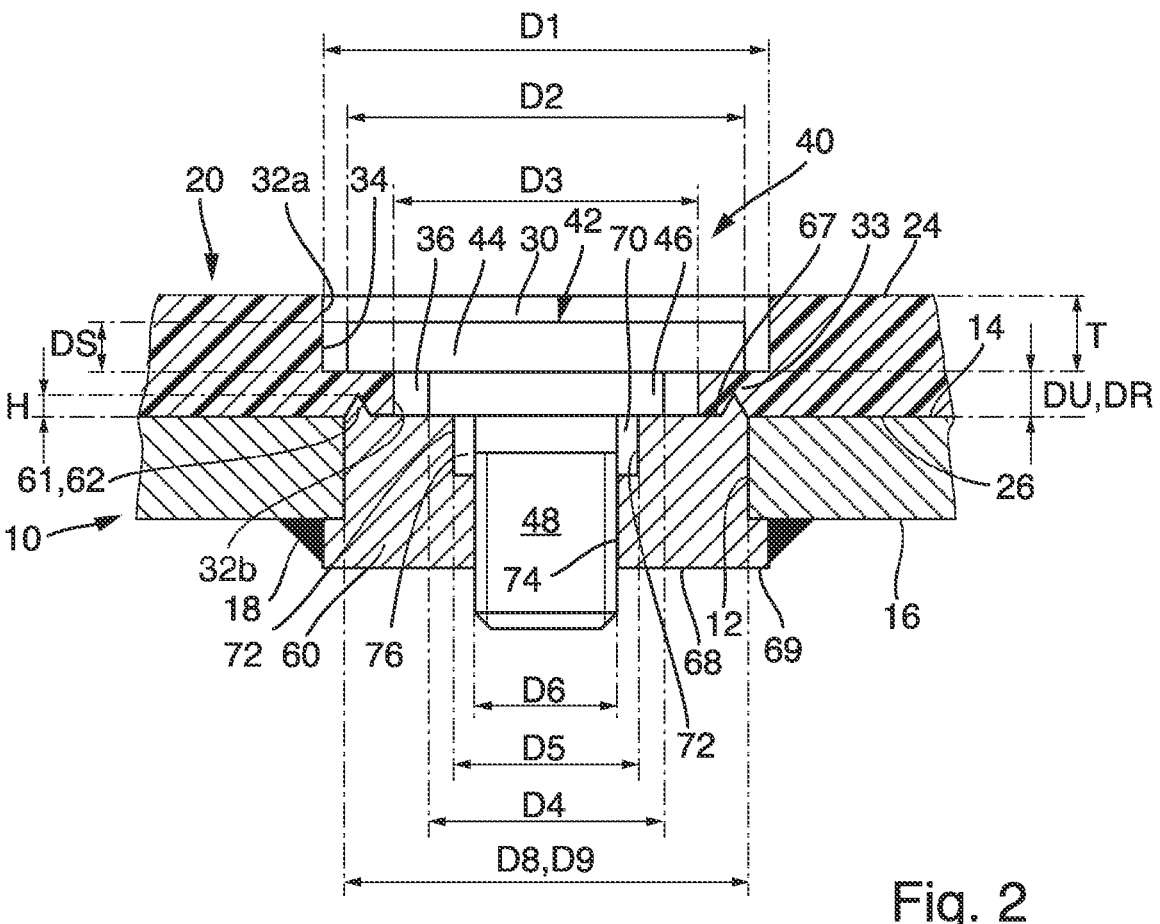
FIG. 2 a section along the line I-I of FIG. 1 according to a first embodiment of the screw connection, FIG. 2a a perspective view of a form-fit element, FIG. 2b a top view of the form-fit element of FIG. 2, FIG. 3 a section along the line I-I in FIG. 1 according to a second embodiment of the screw connection, and FIG. 3a an enlarged view of detail X of FIG. 3.

FIG. 2 shows a section through the fifth wheel plate 10 along the line I-I in FIG. 1, in which a first embodiment of the screw connection 40 according to the invention is shown. The sliding plate 20 has a top surface 24 and a bottom surface 26, and a sliding plate hole 30 having a first hole portion 32a of diameter D1 and a second hole portion 32b of diameter D3 extending downwardly from the top surface 24, thereby forming an annular shoulder 33.

The fifth wheel plate 10 has a top surface 14 and a bottom surface 16, as well as a circular hole 12 into which a form-fit element 60 is inserted. The bottom surface 26 of the sliding plate 20 rests on the top surface 14 of the fifth wheel plate 10. In the embodiment shown herein, the hole 12 has a diameter D8. The diameter D8 of the hole 12 may also be larger or smaller than D1. The outer diameter D9 of the form-fit element 60 is sized to fit within the diameter D8 of the hole 12.

The form-fit element 60 abuts on the bottom surface 26 of the sliding plate 20.

Figure 2A:
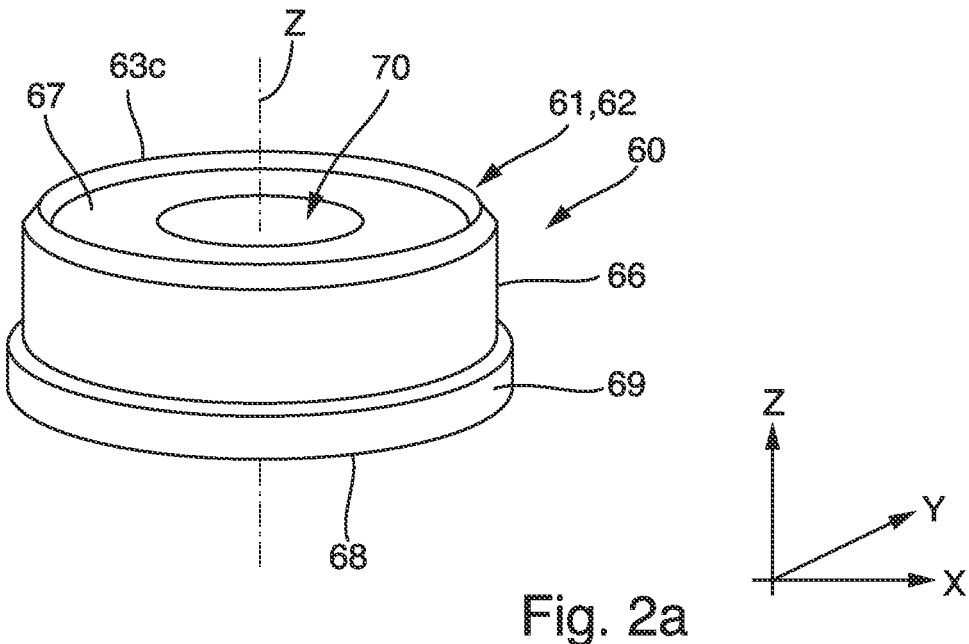

The form-fit element 60 has a form-fit means 61 in the form of a protrusion 62 on the upper end surface 67, which is designed as an annular serration. The ring serration presses into the sliding plate material on the bottom surface 26 of the sliding plate 20. This creates a form-fit connection between the sliding plate 20 and the form-fit element 60, which is effective in the direction of the horizontal plane (xy-plane). The corresponding xyz-coordinate-system is shown in FIG. 2a. Shear forces acting in the horizontal plane, which are caused by the semitrailer (not shown) resting on the upper side of the sliding plate 20 during coupling or during cornering of the semitrailer, are introduced into the form-fit element 60. By virtue of the fact that the form-fit element 60 is also in a form-fit manner and/or a substance-fit manner retained in the hole 12 of the fifth wheel plate 10, such shear forces are introduced into the fifth wheel plate 10 past the fastening means 42.

Preferably, the form-fit element 60 has an annular collar 69 that engages around the bottom surface 16 of the fifth wheel plate 10. The annular collar 69 is welded to the bottom surface 16 of the fifth wheel plate 10, as indicated by the weld seam 18.

Further, the cylindrical form-fit member 60 has a central bore 70 having an annular recess 72 which is followed by a threaded bore 74 into which the fastening means 42, which is a fastening screw, is threaded. The fastening screw has a screw head 44, below which a lower head shoulder 46 and a threaded shank 48 are formed. Alternatively, the fastening screw may be of a multi-piece design with a washer-shaped head portion and a pin portion engaging therewith.

The screw head 44 rests on the annular shoulder 33 of the sliding plate washer 20. The lower head shoulder 46 rests on the top surface 14 of the fifth wheel plate 10. The threaded shank 48 is threaded into the threaded bore 74 of the form-fit element 60. The form-fit element 60 thus also performs the function of a nut for the fastening screw. The welding of the form-fit element 60 to the fifth wheel plate 10 ensures that the form-fit element 60 does not twist when the fastening screw 42 is screwed in.

Alternatively, a longer threaded shank 48 may be used which permits the use of a separate nut not shown here below the form-fit element 60.

When the fastening screw 42 is screwed into the form-fit element 60 or into the nut below it, the screw head 44 presses on the annular shoulder 33 so that the annular serration digs into the material of the sliding plate 20.

The thickness DR of the annular shoulder 33 and the thickness DU of the lower head shoulder 46 are such that a defined and optimum press-in of the annular shoulder 33 results therefrom.

The depth T of the first hole portion 32a is greater than the thickness DS of the screw head. The difference T–DS defines the wear limit of the sliding plate 20.

In this embodiment, the height H of the protrusion 62 formed as an annular serration is equal to DR/2.

The diameter D2 of the screw head 44 and the diameter D4 of the lower head shoulder 46 are respectively smaller than the diameters D1 of the first hole portion 32a and the diameter D3 of the second hole portion 32b. As a result, first and second annular spaces 34 and 36 are formed. As a result, there is no form-fit connection between the fastening screw 42 and the sliding plate 20 in the direction of the horizontal plane, which is advantageous because it keeps shear forces away from the fastening screw.

FIG. 2a shows the form-fit element 60 in perspective view. The form-fit element 60 is a preferably cylindrical body with an axis Z. The form-fit element 60 has a circumferential wall 66, an upper end surface 67, a lower end surface 68, and a central bore 70. The form-fit means 61 concentrically surrounds the central bore 70.

Figure 2B:
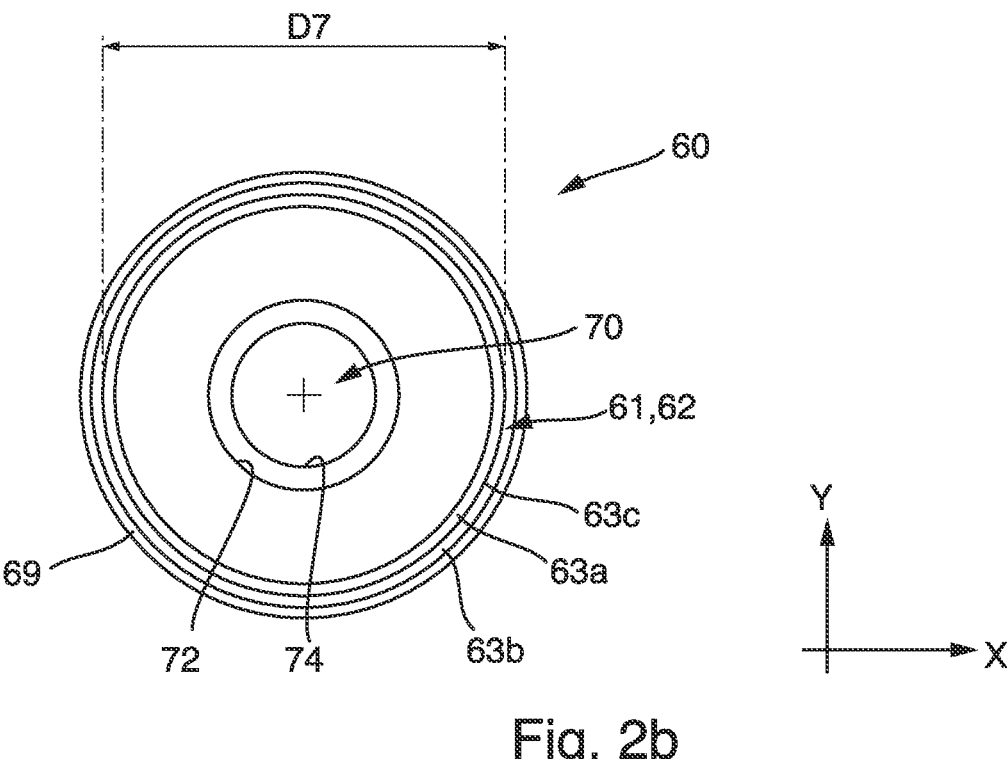

In FIG. 2b, a top view of the upper end surface 67 of the form-fit element 60 is shown. The protrusion 62 is in the form of a closed ring having a diameter D7, the diameter D7 referring to the tip 63c of the protrusion 62. The protrusion 62 may also be in the form of circular arcs. Two or more annular serrations may also be provided, which are arranged concentrically. The protrusion 62 has two flanks 63a, b so that the cross-section of the protrusion 62 forms a triangle, preferably an isosceles triangle. Instead of an annular protrusion, individual linear protrusions can also be provided, which can be arranged in any way relative to one another in the horizontal plane (xy-plane), for example cross-shaped or orthogonal to one another.

Figure 3:
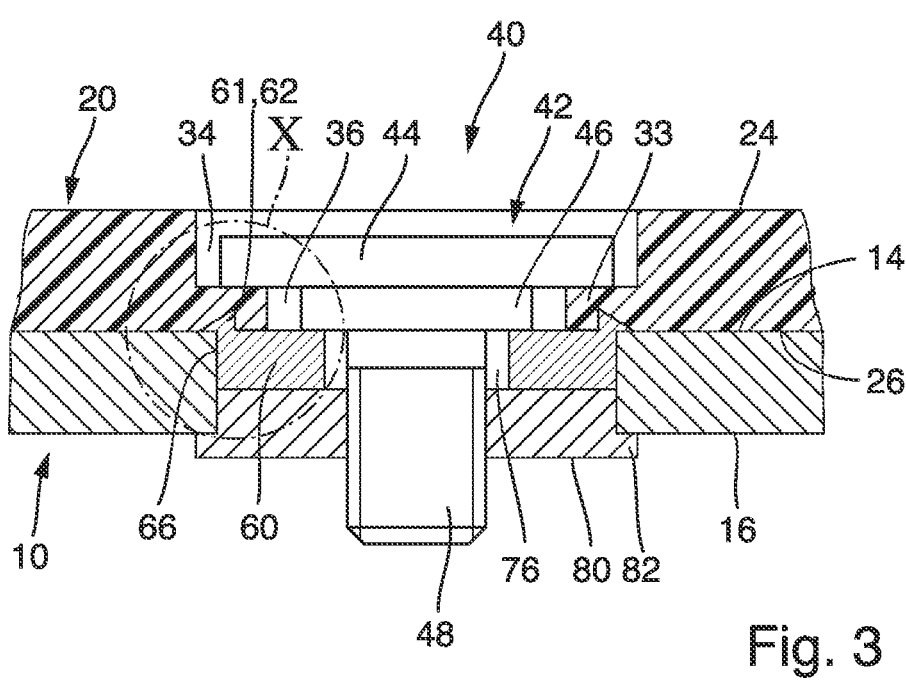

FIG. 3 shows a section through the fifth wheel plate 10 along the line I-I in FIG. 1, in which a second embodiment of the screw connection 40 according to the invention is shown. This embodiment differs from the first embodiment in that the form-fit element 60 is formed as a washer disposed between the lower head shoulder 46 of the fastening screw 42 and a nut 80. The nut 80 is screwed onto the threaded shank 48 from below, whereby the screw head 44 is pressed onto the annular shoulder 33 of the sliding plate 20. In this process, the form-fit means 61 is pressed into the material of the sliding plate 20 on the underside 26. The nut 80 is supported by its collar 82 on the bottom surface 16 of the fifth wheel plate 10.

The washer is also a body having a peripheral wall 66 and a central bore 70. The outer dimensions D9 of the washer are matched to the inner dimensions D8 of the bore 12, as in the first embodiment of the form-fit element 60, so that a form-fit relationship exists between the washer and the fifth wheel plate 10 in the horizontal plane, as in the first embodiment.

Figure 3A:
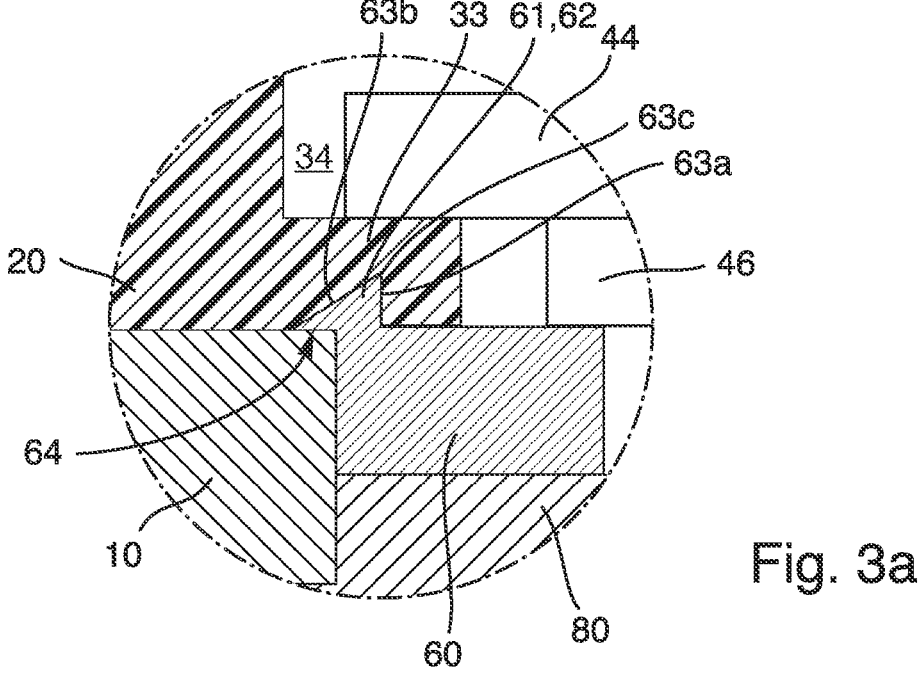

FIG. 3a shows an enlarged view of the detail X of FIG. 3. FIG. 3a shows an enlarged section through the form-fit means 61, which is formed as a modified protrusion 62. The protrusion 62 of the second embodiment is triangular in cross-section. In the embodiment shown here, the flanks 63a and 63 b form a right-angled triangle. The flank 63 b projects radially outwardly with respect to the circumferential wall 66 of the form-fit element 60, thereby forming an annular support surface 64 that bears on the top surface 14 of the fifth wheel plate 10.

LIST OF REFERENCE SIGNS 1 fifth wheel coupling
2 bearing block
3 pivot pin
4 wear ring
5 entry opening
10 fifth wheel plate
11a,b horns
12 hole
14 top surface
16 bottom surface
18 weld seam
20 sliding plate
20a,b sliding plate half

24 top surface
26 bottom surface
30 sliding plate hole
32*a* first hole portion
32*b* second hole portion
33 annular shoulder
34 first annular space
36 second annular space
40 screw connection
42 fastening means, fastening screw
44 screw head
46 lower head shoulder
48 threaded shank
60 form-fit element
61 form-fit means
62 protrusion, serration
63*a,b* flank
63*c* tip of protrusion
64 annular support surface
66 circumferential wall
67 upper end surface
68 lower end surface
69 annular collar
70 central bore
72 annular recess
74 threaded bore
80 nut
82 collar
D1 diameter of first hole portion
D2 diameter of screw head
D3 diameter of second hole portion
D4 diameter of lower head shoulder
D5 diameter of central bore
D6 diameter of threaded shank
D7 diameter of the protrusion
D8 diameter of the hole in the fifth wheel plate
D9 outer diameter of the form-fit element
DS thickness of screw head
DU thickness of lower head shoulder
DR thickness of annular shoulder
H height of the form-fit means
T depth of the first hole section
Z axis

What is claimed is:

1. A fifth wheel plate, comprising:
a sliding plate having a top surface and a bottom surface, and with a horizontal plane, the sliding plate being detachably fastened to the fifth wheel plate by at least one screw connection, the screw connection comprising a fastening means having a screw head and a threaded shank,
wherein the screw connection, in addition to comprising the fastening means having the screw head and threaded shank, comprises a form-fit element which bears against the bottom surface of the sliding plate and which has a form-fit means, and wherein the form-fit means cooperates with the sliding plate and forms a form-fit connection acting in the direction of the horizontal plane.

2. The fifth wheel plate according to claim 1, wherein the form-fit means presses into the material of the sliding plate at the bottom surface of the sliding plate.

3. The fifth wheel plate according to claim 1, wherein the form-fit means comprises at least one protrusion.

4. The fifth wheel plate according to claim 1, wherein the form-fit means at least partially surrounds the fastening means.

5. The fifth wheel plate according to claim 1, wherein the form-fit element is arranged in a form-fit and/or substance-fit manner in a hole of the fifth wheel plate.

6. The fifth wheel plate according to claim 1, wherein the form-fit element has a circumferential wall, an upper end surface facing the sliding plate and a lower end surface, the form-fit means being arranged on the upper end surface.

7. The fifth wheel plate according to claim 1, wherein the form-fit element comprises a central bore, and in that the threaded shank extends into or through the bore.

8. The fifth wheel plate according to claim 7, wherein the central bore comprises a threaded bore into which the threaded shank is threaded.

9. The fifth wheel plate according to claim 1, wherein the form-fit element is a washer.

10. The fifth wheel plate according to claim 1, wherein the form-fit element is arranged between the screw head and a nut.

11. The fifth wheel plate according to claim 1, wherein the sliding plate has at least one sliding plate hole in which an annular shoulder is formed.

12. The fifth wheel plate according to claim 11, wherein the form-fit means of the form-fit element is arranged below the annular shoulder.

13. The fifth wheel plate according to claim 11, wherein the screw head engages the annular shoulder.

14. The fifth wheel plate according to claim 1, wherein the fastening means is a fastening screw.

15. The fifth wheel plate according to claim 14, wherein the fastening screw has a lower head shoulder between the screw head and the threaded shank.

16. The fifth wheel plate according to claim 1, wherein a first annular space is provided in a sliding plate hole between the screw head and the sliding plate.

17. The fifth wheel plate according to claim 15, wherein a second annular space is provided in a sliding plate hole between the lower head shoulder and the sliding plate.

18. The fifth wheel plate according to claim 1, wherein the sliding plate is made of a deformable material.

19. The fifth wheel plate according to claim 1, wherein the fifth wheel plate is made of a sheet metal moulding.

20. A fifth wheel coupling, comprising: a fifth wheel plate comprising a sliding plate, according to claim 1.

* * * * *